US008978151B1

(12) United States Patent  (10) Patent No.: US 8,978,151 B1
Chamberlain  (45) Date of Patent: Mar. 10, 2015

(54) REMOVABLE DRIVE SECURITY MONITORING METHOD AND SYSTEM

(76) Inventor: Craig Chamberlain, Waltham, MA (US)

( * ) Notice: Subject to any disclaimer, the term of this patent is extended or adjusted under 35 U.S.C. 154(b) by 123 days.

(21) Appl. No.: 13/593,449

(22) Filed: Aug. 23, 2012

Related U.S. Application Data

(60) Provisional application No. 61/526,533, filed on Aug. 23, 2011, provisional application No. 61/526,544, filed on Aug. 23, 2011.

(51) Int. Cl.
G06F 7/04 (2006.01)
(52) U.S. Cl.
USPC .......................................... 726/26
(58) Field of Classification Search
CPC .... G06F 21/00; G06F 21/31; G11B 20/00086
USPC ..................................... 726/26–30
See application file for complete search history.

(56) References Cited

U.S. PATENT DOCUMENTS

2007/0274521 A1* 11/2007 Asano ........................... 380/202
2010/0046915 A1* 2/2010 Ueda et al. ...................... 386/94

* cited by examiner

*Primary Examiner* — Anthony Brown
(74) *Attorney, Agent, or Firm* — Stephen E. Zweig (57) ABSTRACT

A method of detecting the unauthorized use of removable storage drives to obtain data from a computer network. An automated software process periodically polls the various logical disks in a computer or computer network for removable data drives, determines which are high risk removable data drives, and monitors these removable drives every few seconds. The process checks for security problems by file name, or mismatch in privileges, or suspicious file write, copy or copy-delete patterns of usage. If a preset risk threshold is exceeded, the system then alerts system administrators. In a preferred embodiment, the method may be implemented on network administration systems such as Windows management instrumentation (WMI) using default scripting or process tools such as VBscript.

20 Claims, 8 Drawing Sheets

```
M:\scripts\release>
M:\scripts\release>
M:\scripts\release>script leakomatic.vbs d600
Microsoft (R) Windows Script Host Version 5.8
Copyright (C) Microsoft Corporation. All rights reserved.

Scanning for Removable Disks on d600

***** A removable drive has been detected *****

D: is a removable drive on d600 named LEXAR MEDIA
Drive contains 6.995968 MB of data Details Follow -----------------------------------------------------------------------
Removable drive detected on d600
Time of Detection: 1/23/2011 9:03:42 PM
Device ID is: D:
Description is: Removable Disk
Size is 519.274496 MB Filesystem is: FAT
Volume Name is: LEXAR MEDIA
Capacity is 519274496
6995968 bytes used on the disk
Media type is:
Drive type is: 2
-----------------------------------------------------------------------

Monitoring file activity on removable disk D:
```

```
Monitoring file activity on removable disk D:

File Created:  d:\customer data.accdb
File Created:  d:\engineering diagrams.vsd
File Created:  d:\financials.accdb
File Created:  d:\intellectual property.docx
File Created:  d:\payroll.xlsx
File Created:  d\sales numbers.pptx
File Created:  d:\source code.zipx
File Deleted:  d:\customer data.accdb
File Deleted:  d\engineering diagrams.vsd
File Deleted:  d:\financials.accdb
File Deleted:  d:\intellectual property.docx
File Created:  d:\new folder <2>\customer data.accdb
File Created:  d:\new folder <2>\engineering diagrams.vsd
File Created:  d:\new folder <2>\financials.accdb
File Created:  d:\new folder <2>\payroll.xlsx
File Created:  d:\new folder <2>\sales numbers.pptx
File Created   d:\new folder <2>\source code.zipx
File Deleted:  d:\payroll.xlsx
File Deleted:  d:\source code.zipx
File Deleted   d:\new folder <2>\customer data.acdb
File Deleted   d:\new folder <2>\engineering diagrams.vsd
File Deleted   d:\new folder <2>\financials.accdb
File Deleted   d:\new folder <2>\intellectual property.docx
File Deleted   d:\new folder <2>\payroll.xlsx
File Deleted   d:\new folder <2>\sales numbers.pptx
File Deleted   d:\new folder <2>\source code.zipx
```

Figure 5

```
M:\scripts\release>script dvd-leakomatic.vbs  7box
Microsoft (R) Windows Script Host Version 5.8
Copyright (C) Microsoft Corporation. All rights reserved.

Connecting to computer: 7box

Looking for Life File System DVDs on 7box
***** A Live File system DVD has been detected *****

Drive E: appears to be a LFS DVD on computer: 7box
Drive E: has a UDF filesystem and non-zero free space
Drive E: contains 365.65625 MB of data Details follow From the Win32-LogicalDisk query results:
------------------------------------------------------------------------
A writeable DVD has been detected on 7box
Time of Detection: 1/30/2011  8:46:07 PM
DeviceID is E:
Description is: CD-ROM Disc
Size is: 4700.372992 MB Filesystem is: UDF
Volume Name is: Jan 23 2011
Capacity is: 4700.372992 MB
3205.03808 bytes used on the disk
Free space is: 4377869184 bytes
Media type is: 11
Drive type is: 5
------------------------------------------------------------------------

Monitoring file activity on removable disk E:
```

Figure 6

```
File Deleted:  e:\meteora\01 foreword.mp3
File Deleted:  e:\meteora\02 don't stay.mp3
File Deleted:  e:\meteora\03 somewhere I belong.mp3
File Deleted:  e:\meteora\04 lying from you.mp3
File Deleted:  e:\meteora\05 hit the floor.mp3
File Deleted:  e:\meteora\06 easier to run.mp3
File Deleted:  e:\meteora\07 faint.mp3
File Deleted:  e:\meteora\08 figure.09.mp3
File Deleted:  e:\meteora\09 breaking the habit.mp3
File Deleted:  e:\meteora\10 from the inside.mp3
File Deleted:  e:\meteora\11 nobody's listening.mp3
File Deleted:  e:\meteora\12 session.mp3
File Deleted:  e:\meteora\13 numb.mp3
File Created:  e:\files\customer data.accdb
File Created:  e:\files\engineering diagrams.vsd
File Created:  e:\files\financials.accdb
File Created:  e:\files\intellectual property.docx
File Created:  e:\files\payroll.xlsx
File Created:  e:\files\sales numbers.pptx
File Created:  e:\files\source code.zipx
```

REMOVABLE DRIVE SECURITY MONITORING METHOD AND SYSTEM

CROSS REFERENCE TO RELATED APPLICATIONS

This application claims the priority benefit of U.S. provisional patent application 61/526,544 "REMOVABLE DRIVE SECURITY MONITORING METHOD AND SYSTEM", inventor Craig Chamberlain, filed Aug. 23, 2011; This application also claims the priority benefit of U.S. provisional application 61/526,533 "REMOVABLE DRIVE SECURITY MONITORING METHOD AND SYSTEM", inventor Craig Chamberlain, also filed Aug. 23, 2011; the contents of these applications are incorporated herein by reference.

BACKGROUND OF THE INVENTION

1. Field of the Invention

This invention is in the field of computer security and data loss detection.

2. Description of the Related Art

Computer security problems are both ubiquitous and infamous in the modern world. One important class of security problems is caused by data leaks, where an attacker, who may be a trusted member of the organization using various computers and computer networks, gains access to a computer or network holding sensitive information. The attacker may then insert a removable drive, such as a USB memory stick, writeable CD, writeable DVD and the like in the computer, download sensitive files, and then may use these sensitive files to cause a considerable amount of damage.

One of the more recent examples of this type of problem was an incident involving a large scale government data leak. Here, although the computers had been configured to disallow portable USB drives, the perpetrator was alleged to have gained access to sensitive information by using a rewritable CD (CD-RW) containing popular music. The attacker allegedly used a homemade rewriteable CD, containing music, to download sensitive files.

In addition to sensitive governmental information, many other types of data breaches are common, including bank data, corporate customers list, credit card data, intellectual property, medical records, and the like.

To help reduce the severity of this type of problem, in recent years a data loss detection industry has sprung up. The field has grown to the point that millions of dollars are now spent purchasing complex data loss detection hardware and software products. However due to economic constraints, lower cost methods to prevent data loss would, of course, be highly valued.

Windows Management Instrumentation (WMI)

Operating systems, such as Windows, UNIX, Linux, and the like often have various standard methods to manage internal organizational networks, which in some cases may be composed of tens of thousands of individual computers or more. Such systems allow network administrators to write scripts and applications to automate various administrative functions on these various computers, often from a centralized location. These systems may often use a common information model (CIM) standard to represent the wide variety of diverse computerized devices on the organization's network. A script or application running from a central location may access these various computers, and perform various administrative tasks, by way of forming Distributed Component Object Model (DCOM), COMsource, Windows Management Instrumentation (WMI) connections, or other type connections with the remote computers.

Using the Windows management instrumentation (WMI) as a particular example, various scripts and applications can be written to enable WMI to help perform administrative tasks on remote network computers in various compiled and interpreted scripting languages.

Thus, for example, a system administrator might use various scripts that in turn call WMI to perform various functions such as to obtain information about what operating system is installed in the various computers, what printers are installed, the computer disk drive state, if the computer is a desktop or laptop, control screensavers, shut down remote computers, and so on.

BRIEF SUMMARY OF THE INVENTION

The invention is based, in part, on the insight that standard network configuration software, such as Windows Management Instrumentation and the like, may, through the use of the methods of the invention, be used to also perform relatively advanced security functions that exceed the original design intent of such network configuration software.

In particular, according to the invention, information pertaining to the computer's disk drives, and the logical state of these disk drives, in conjunction with suitable file and folder operations can be used as an efficient manner to detect certain types of data breach problem, most notably situations similar to that previously described in the recent public (government) record incident.

Thus in some embodiments, the invention may be a method of detecting the unauthorized use of removable storage drives to obtain data from a computer or computer network. This method will generally comprise first initiating an automated software script or process to periodically poll the various logical disks in a computer or computer network for removable data drives, thereby creating a list of removable data drives. The method will then also determine which of the removable data drives on the list of removable data drives are high risk data drives, thereby creating a list of high risk removable data drives. Next the file activity on at least some of these high risk removable data drives will be monitored periodically at a fairly high frequency, often once every second or every few seconds. The script or process will determine if either the file name, or a mismatch in expected file usage (e.g. someone in engineering trying to access files in a different department such as finance, or vice versa), or the pattern of file activity on the at least one of said high risk removable data drive matches exceeds a preset risk threshold. If this preset risk threshold is exceeded, then a preset suspicious activity function, such as creating a suspicious event list, contacting system administrators, and the like may then commence.

DETAILED DESCRIPTION OF THE INVENTION

As previously discussed, in some embodiments, the invention may be a method of detecting the unauthorized use of removable storage drives, such as USB drives, rewriteable CD or DVD drives, and the like to obtain data from a computer or computer network.

This method will generally comprise first initiating an automated software script or process to periodically the poll the various logical disks in a computer or computer network for removable data drives, thereby creating a list of removable data drives. In some embodiments, it will be useful to write the script in the lowest common denominator scripting language available to the network. This avoids the need to have to install additional scripting language interpreters, compliers, and the like into the network system, which in turn tends to avoid working around other network security software and lockouts.

This automated software script or process will normally run on at least one computer processor (e.g. microprocessor), and often a plurality of microprocessors. It will reside in memory, be executed from memory, and output its results to at least one computer file, display screen, printer, electronic warning device, or other output method.

Thus, for example, when the network is running various versions of windows, and is being administered by systems such as Windows management instrumentation (WMI), it may be advantageous to implement the methods of the invention in the form of various Visual Basic scripts (VBscripts), because such interpreters are normally present in these systems as a default, lowest common denominator, functionality. Use of the WMI/VBscript combination adds to the stealthiness of the technique, because usage this resembles routine maintenance and system management activity. Because such scripts are so common, this technique reduces the likelihood that the target subject will realize that they are under investigation. This in turn increases the probability of success of the investigation and/or counterintelligence campaign.

The inventions methods will often then also determine which of the removable data drives on the list of removable data drives are high risk data drives. Such high risk data drives can be drives such as drives with writeable CD disks, or writeable DVD disks, or writeable blue-ray disks, or any drive with a FAT or FAT32 file system. Alternatively, certain individuals or groups with either access to sensitive information, or to which a higher than average degree of monitoring is considered appropriate, can also be designated as high risk. As a result of this process, a list of high risk removable data drives can be generated.

Next the file activity on at least some of these high risk removable data drives will be monitored periodically at a fairly high frequency, often once every second or every few seconds, and usually more frequently than every ten seconds. The idea here is to be able to detect the quickest time in which an attacker could plug in a removable drive, download at least one file, and unplug the drive, and this may be determined by experiment based on actual removable drive hardware and the characteristics of the network and the network's computers.

The script or process will determine if either the file name, or a mismatch in expected file usage (e.g. someone in engineering trying to access files in a different department such as finance, or vice versa), or the pattern of file activity on the at least one of said high risk removable data drive matches exceeds a preset risk threshold.

Here some patterns of file activity are more suspicious than other. One of the highest risk patterns of file activity, for example, is one in which a file is first written to the removable drive, and then deleted from the removable drive soon afterwards. This is suspicious because such delete operations do not typically erase all file data, but rather simply make the file data harder to find on casual inspection (e.g. a guard plugging in the removable drive and doing a simple directory scan).

In terms of the risk profile of various file names, for example, here various blacklists of high risk file names or directory locations, or alternatively whitelists of safe file names or directory locations, can be constructed and used by the system to determine relative risk accordingly.

If this preset risk threshold is exceeded, then a preset suspicious activity function, such as creating a suspicious event list, contacting system administrators, and the like may then commence.

EXAMPLES

Some working examples, celled "Drivenator" "Leakinator", "Leakomatic" were developed by the inventor using Windows Management instrumentation (WMI) and VBscript. The inventor published a writeup of the concept on the web at craigchamberlain.blogspot.com on January, 2011 as: "*Introducing Leakinator: A Lightweight USB/Removable Drive Monitor, On A Zero Sum Budget, In 15 Minutes*". This disclosure is shown in Appendix I of the parent provisional application 61/526,544, the contents of which are incorporated herein by reference.

Additionally, two follow up articles on this were also published by the inventor in January, 2011. These are, "Question: Why Is Leakinator Implemented In VBscript?" and "Data Leak Detection, Continued". These are shown in Appendix II and Appendix III of provisional application 61/526,544.

Generally, it is advantageous to implement the invention using whatever scripting environment or program execution environment is native to the computer network system. Avoiding installing additional software (e.g. Java, .NET, and the like) is particularly advantageous for security work because in addition to the extra work involved to install additional software agents or programs, doing so could potentially tip off the suspected security risk that they are being monitored. Ideally the security methods of the present invention will "fly under the radar" as far as the potential attacker is concerned.

Accordingly VBscript was used for this example because the windows script host has been built-in to every Windows version since 2000, as is WMI.

The Leakinator working examples in turn consisted of three scripts, with the following functionality:

For single computer installations and/or simple computer environments were removable drives are rare, and/or there is a known removable drive that is being monitored, a script called Leakomatic.vbs may be used. Leakomatic.vbs enumerates logical disks until it finds a removable drive; it then begins monitoring file activity on the first discovered removable drive.

Figure 1A:
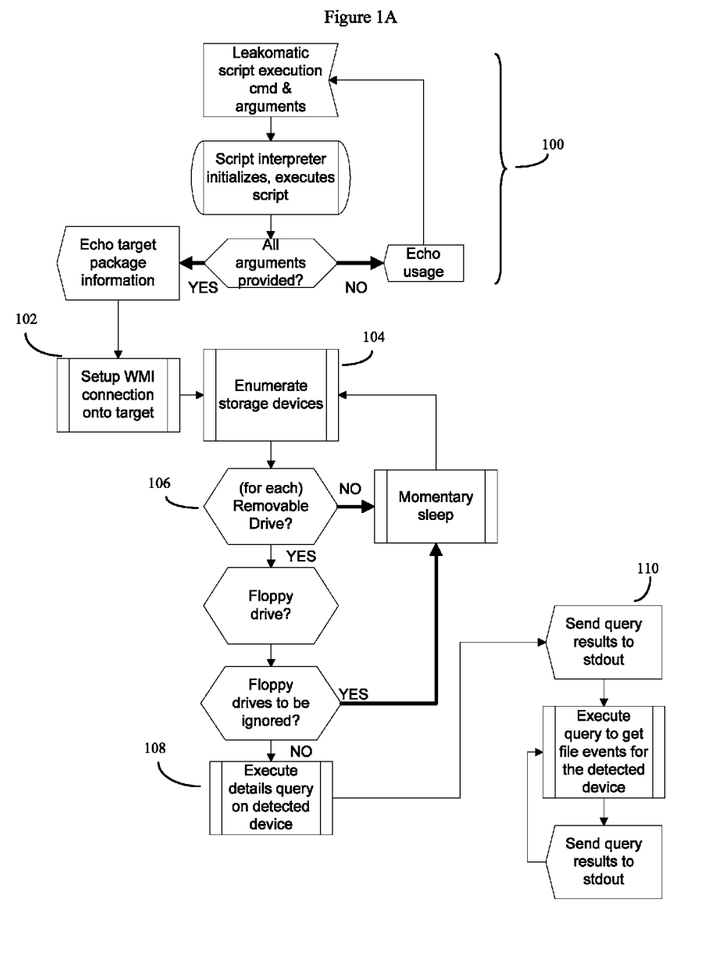
FIG. 1A shows a flow chart of the invention's Leakomatic method.

A flow chart of the invention's Leakomatic method is shown in FIG. 1A. Here, after initial setup (100), the Leakomatic script sets up the WMI connection to the target computer (102), and enumerates its storage drives (104). For each removable drive (106), which optionally may include floppy drives, the system will execute a query (108) on the detected removable drive, and send the results to stdout. A query will then be executed to get the file events for that particular removable drive, and this also will be sent to the standard output where the script can write its output data, stdout (110). These results may then either be viewed by a human observer, or more commonly analyzed by software to detect suspicious events, such as the events which will be described shortly.

Figure 1B:
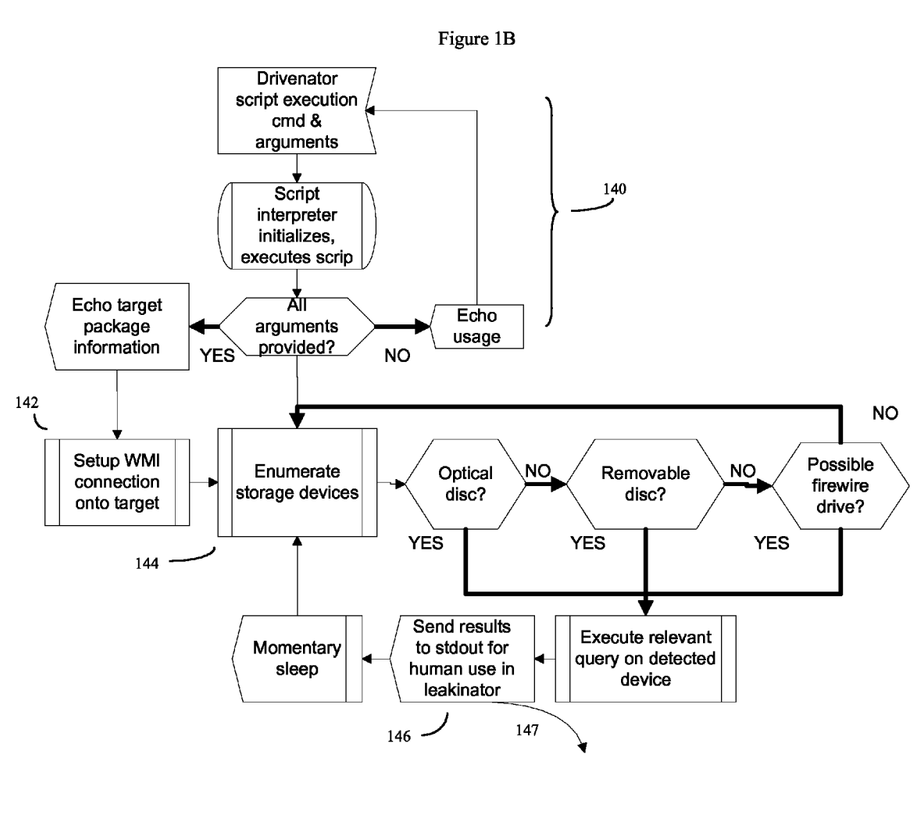
FIG. 1B shows the first part of the flow chart of the invention's alternate Drivenator/Leakinator method.

For more complex environments, such as network environments, a two script solution was implemented in the form of two loops; one controlled by a Drivenator script, and the other controlled by the Leakanator script. This is shown in FIGS. 1B and 1C.

In the first loop, the Driveinator.vbs script initializes (140), and again through WMI (142) finds the various storage devices (144), and alerts (146) when it finds a removable drive (type 2); a writable CD/DVD disc; or any drive with a FAT or FAT32 filesystem.

Once the first (Driveinator) loop finds a removable disk such as a USB disk or rewriteable CD/DVD disk (146), it goes into a second (Leakinator) loop where every second, it polls all file events for the removable disk.

Figure 1C:
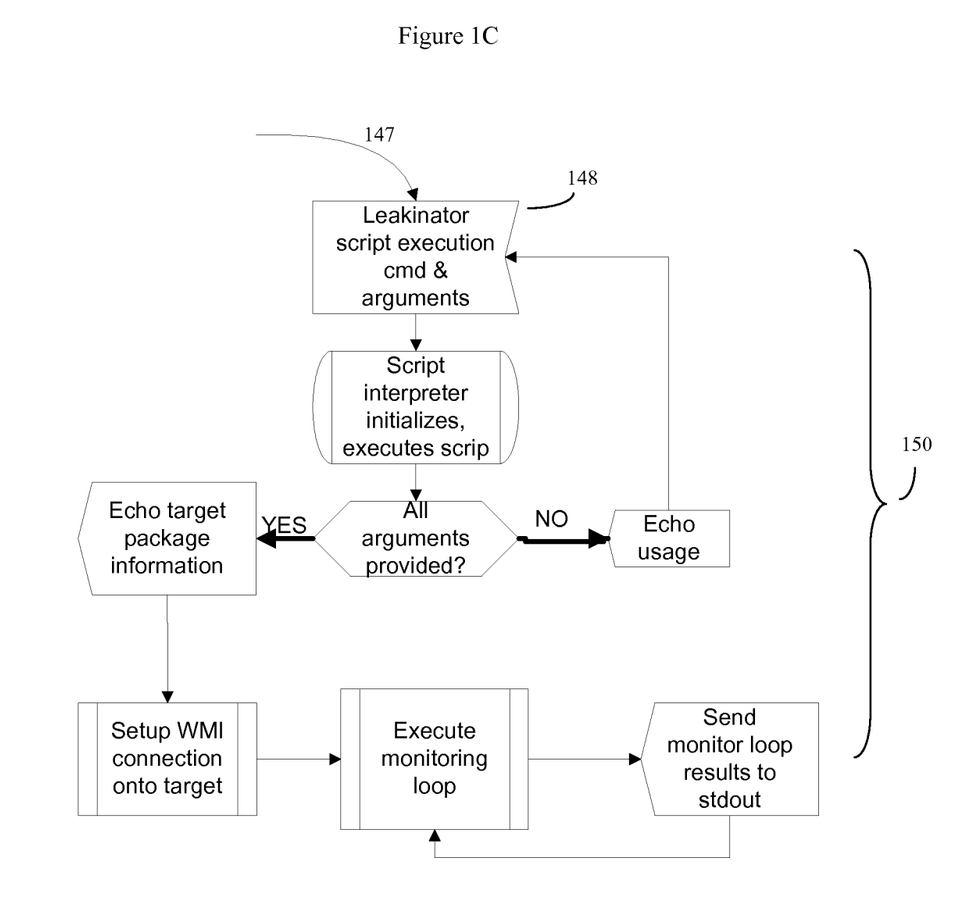
FIG. 1C shows the second part of the flow chart of the invention's alternate Drivenator/Leakinator method.

In this second loop, the output of Drivenator.vbs, which is the drive letter of the removable drive, is then fed (146) (147) (either automatically or via a human operator) to a second script, Leakinator.vbs (148), shown in FIG. 1C. Leakinator.vbs monitors file activity on a drive letter specified by the output of Drivenator.vbs. Leakinator (150) then acts much as the earlier Leakomatic script previously discussed in FIG. 1A.

The advantage of this double loop approach is load management. If a large network attempted to continually examine the state of all disks on the network every few seconds, the load would become undesirably large. By contrast, by restricting the detailed inspection to removable disks, the load becomes much more manageable.

As previously discussed, in some embodiments, the system and method may be configured to run all operations automatically. In these embodiments, the system will continually monitor the state of a network containing a plurality of computers and a plurality of drives, scan for suspicious activity, and automatically inform the system operators when such suspicious activity has been detected.

Figure 2:
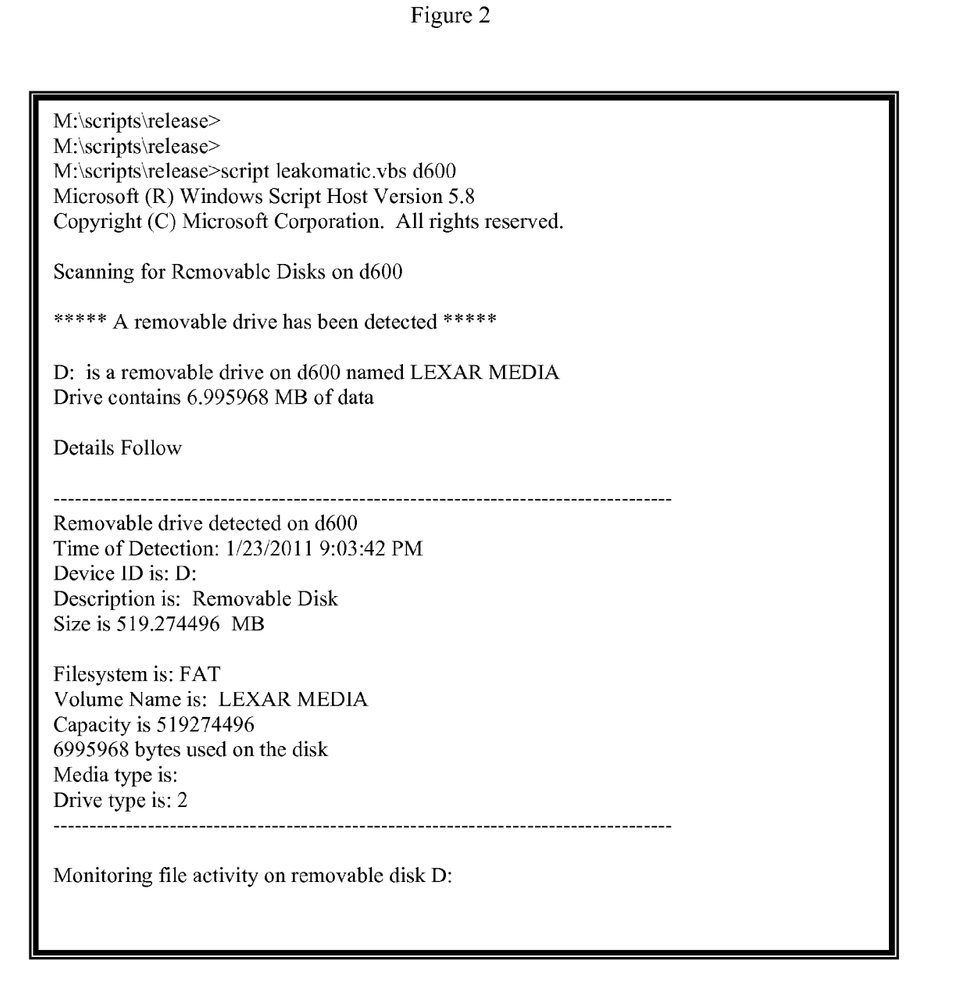
FIG. 2 shows a screenshot showing the characteristic profile of a removable USB drive.

A screenshot showing the characteristic profile of a removable USB drive is shown in FIG. 2.

For example, consider the following scenario. A subject is occasionally connecting a USB drive and copying sensitive data that should not be copied. Because the USB drive is only connected for a few minutes each day, it is both hard to detect, and hard to prove that the illicit file transfers are actually taking place.

In this scenario, assume that only a single computer is suspect, and let us further stipulate that the suspect computer normally has no removable drives, and only one drive is expected. Here a security analyst can run Leakomatic.vbs with the name of the suspect computer (target computer) as an argument.

Initially, when Leakomatic.vbs connects to the target via WMI, it will usually, when examining the logical disk table, find nothing interesting because the subject has not yet plugged in their removable USB drive. Here Leakomatic can continue running on a continual basis until the human suspect (subject) plugs in their removable USB drive.

Figure 3:
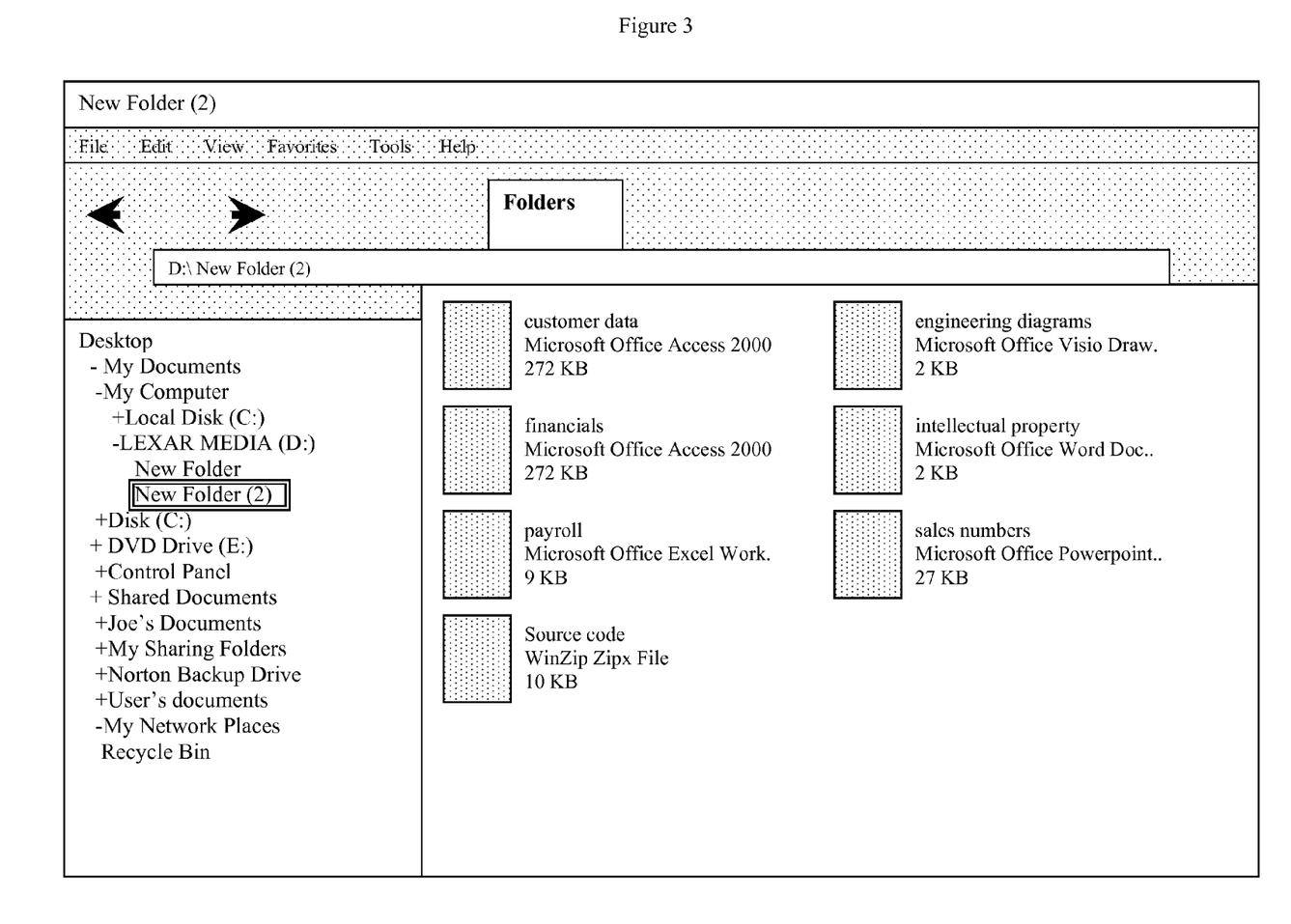
FIG. 3 shows the computer configuration change that can be detected when a subject plugs a removable USB drive into a computer.

The system can then detect when the suspect/subject plugs in their removable USB drive, as shown in FIG. 3. When this happens, in this embodiment, the security analyst immediately receives an alert that a removable drive has been connected. The system further identifies that, in this example, the subject has attached an unapproved 512 MB Lexar USB drive containing 6 MB of data (previously shown in FIG. 2).

Figure 4:
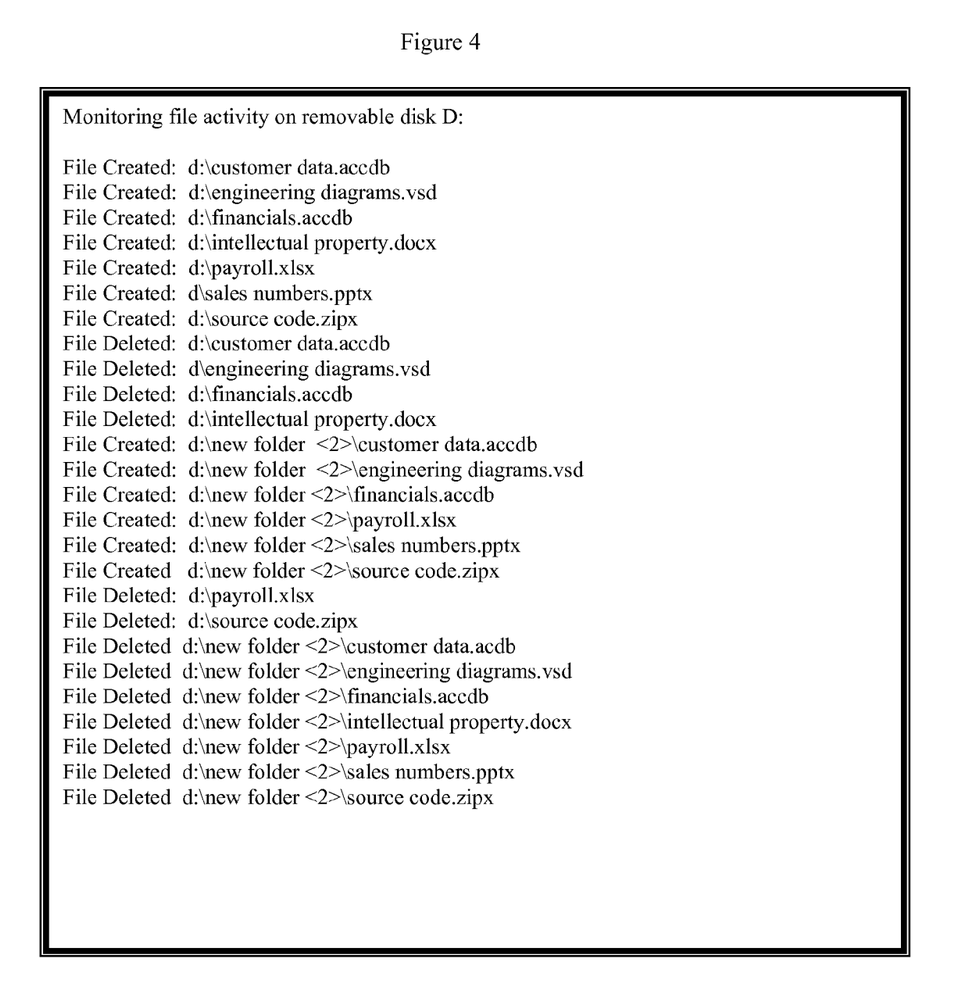
FIG. 4 shows a suspicious pattern of copying and deleting files onto a removable USB drive.

In this scenario, assume further that after a few minutes, the subject begins copying confidential data. Here Leakomatic.vbs will log each operation. Further, in a particularly suspicious scenario, assume that the subject then decides to try to cover his tracks. In this example, he does so by opening the removable USB drive, dropping the new copied files in a new folder so that they're not present on the root of the file system, and then deleting this folder. The idea here is that if he is stopped by a security guard, and the contents of the USB drive examined by a simple directory scan at the security guard's computer, the deleted file will not show up. The suspect plans to then undelete the deleted disk with a standard disk file recovery utility program later on. This suspicious pattern of copying to the removable drive, followed by deletion, is shown in FIG. 4.

The Invention however, allows this suspicious sequence of: plug in a removable disk drive, copy files, delete files to be detected and logged. Additionally, other appropriate corrective action can also commence. For example, once this suspicious sequence has been detected, several response options can be either programmed into the system, or alternatively done by a human security analyst. These response options include:

1: Remotely disconnect the drive using mountvol/D (this can be done using WMI and VBscript)

2: Take a copy of the files on the drive as evidence; if the user has not deleted them (this can be done using additional shell scripts or utilities such as psexec).

3: Notify HR/facilities that a USB drive needs to be confiscated

4: Continue the investigation and monitor activity on the drive

Example 2

In the original public data leak example, discussed previously, the data leak was apparently by a live file system DVD masquerading as a music CD, rather than by a removable USB drive.

A live file system DVD comes into being when a DVD-R is formatted with a live file system; this happens when the user selects "like a USB flash drive" when the disc is first inserted. With this option selected, the disc works very much like a USB drive, allowing arbitrary file creation and deletion. These types of discs can also be monitored using Windows Management Instrumentation (WMI) like a disk drive, unlike a regular CD/DVD, as LFS discs seem to use the file subsystem rather than the CDROM subsystem.

Identifying writable CD/DVD discs can also be done under Windows, as well as other operating systems. Again using the Windows OS as a specific example, the Windows OS sees this type of rewriteable CD/DVD disk as a "UDF" file system. By contrast, read-only CD/DVD discs have a "CDFS" filesystem. Live file system DVDs can be further differentiated from ordinary writable DVDs in another attribute: Live file system DVDs report non-zero free space in bytes like a disk drive. By contrast, ordinary writable DVDs report zero bytes free space.

Thus a live file system DVD will show up under WMI as follows:

```
Thus a live file system DVD will show up under WMI as follows:
------------------------------------
Win32_LogicalDisk instance
------------------------------------
CreationClassName: Win32_LogicalDisk
Description: CD-ROM Disc
DeviceID: E:
DriveType: 5
FileSystem: UDF
FreeSpace: 4557275136
```

Thus the invention additionally can detect and monitor live file system DVDs using the same type of VBscript previously used to monitor removable USB drives.

In a second scenario, consider another security breach that addresses this type of LFS DVD based data leak.

Figure 5:
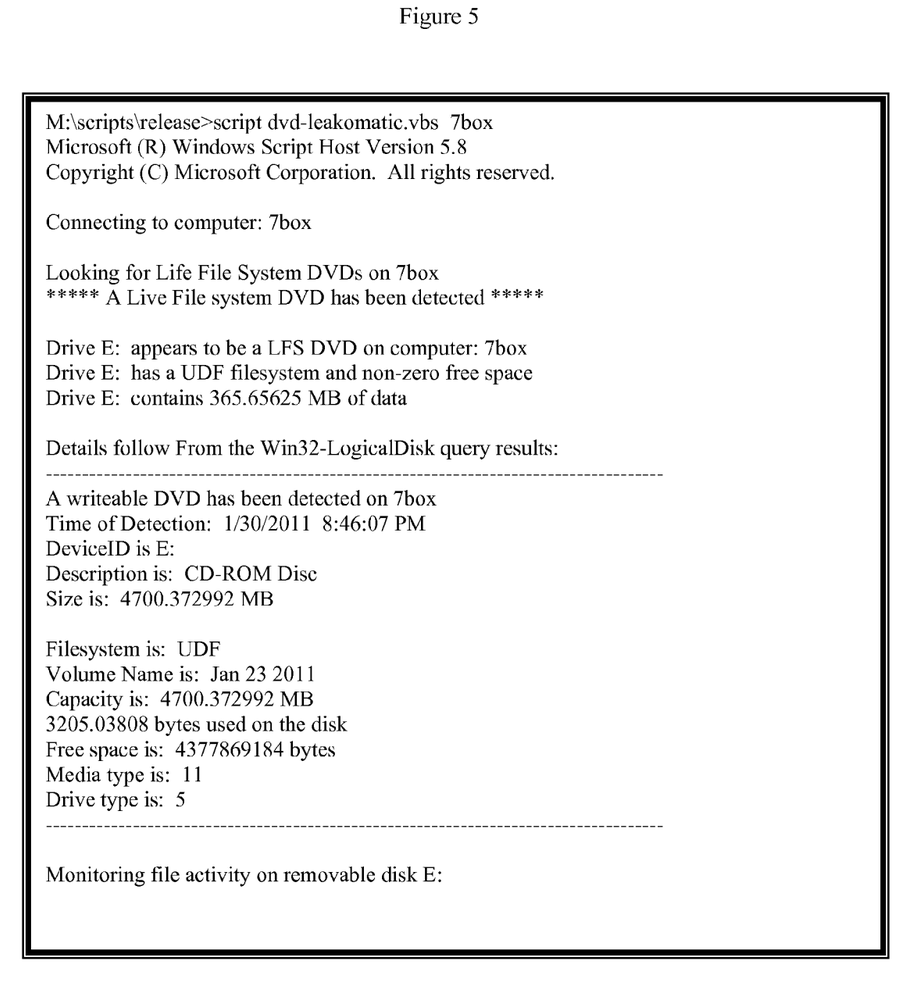
FIG. 5 shows the characteristic disk signature of a LFS rewriteable DVD.

In this second scenario, assume that the computer network or computer system has disallowed the use of removable USB drives, but that the various computers still have read-write DVD drives. Here the security analyst may use a modified version of the "Leakomatic" script previously used to detect and monitor removable drives. Here, however, this modified version may optionally ignore removable drives, and instead focus on detecting LFS DVDs with a UDF filesystem, and free space greater than zero, as is shown in FIG. 5.

Here the system, either automatically or by analyst command, runs the script and either manually or automatically provides the name of the target computer. The script connects to the target across the network and examines the target system. If no DVD is present, the script will wait (i.e. repeat the query every few seconds) while it waits for the arrival of a disc.

Assume here an exact repeat of the previously discussed government data leak. As before, the subject arrives with a DVD containing MP3 files labeled to appear as a music CD. He inserts the DVD, and begins listening to the music on the disc. The disc is immediately detected, as is shown in FIG. 5.

Figure 6:
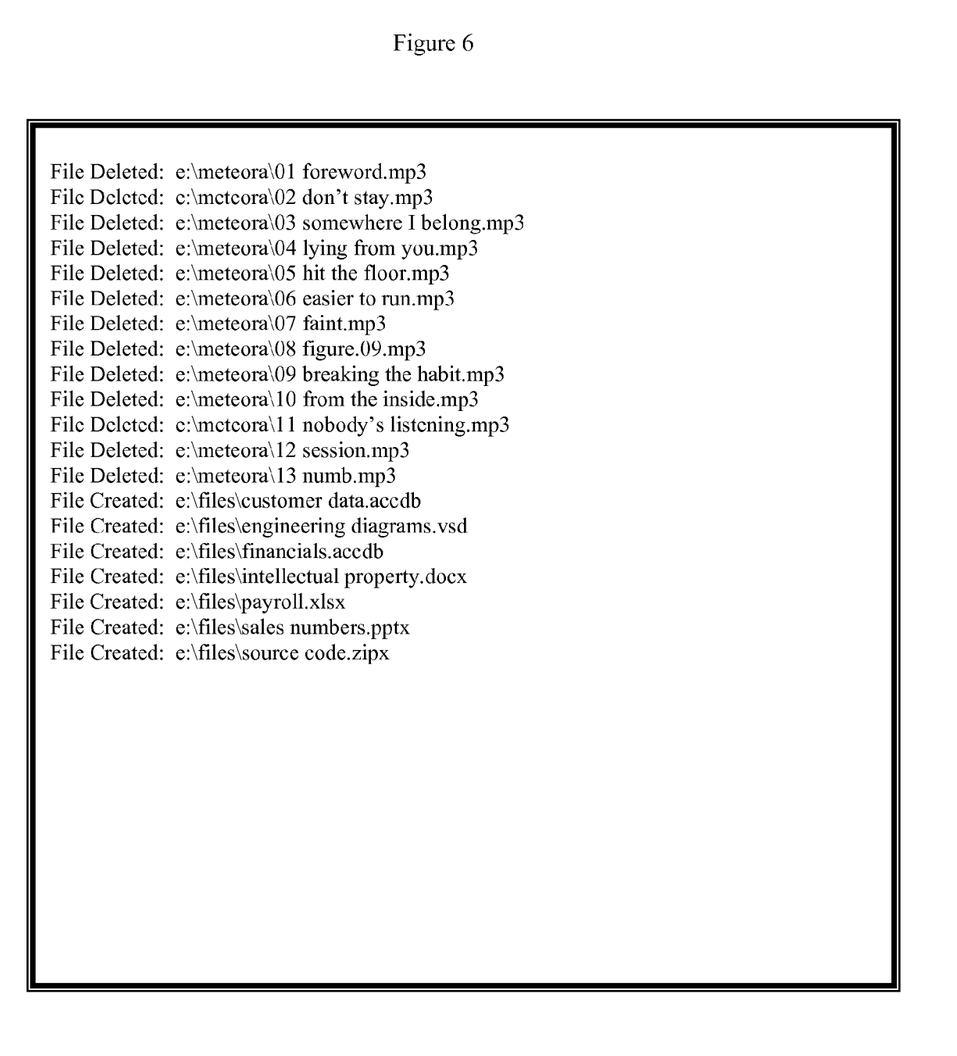
FIG. 6 shows a suspicious pattern of copying and deleting files onto a rewritable DVD.

After a while, the subject deletes MP3 files to free up space and starts copying confidential files onto the DVD. This is shown in FIG. 6. The subject watches for signs of detection or monitoring, ready to delete the confidential files from the disc if necessary to erase the evidence. What he does not know is that all of this file activity is logged by the script the security analyst is running, including the deletes, and the analyst has found her leak.

Detection of non-LFS writable discs requires an alternate method, as these use the CDROM subsystem for file writes, which is less conspicuous. Here this type of removable disk can be detected because they use a UDF file system, and in a high security environment, the appearance of all writeable disks can be automatically investigated using the automated methods described here.

Appendix IV of provisional application 61/526,544, the contents of which are incorporated herein by reference, shows an example of another leak detection session, very similar to the examples previously shown in FIGS. 2-6.

The invention claimed is:

1. A method of detecting unauthorized use of removable storage drives to obtain data from a computer or computer network, said method comprising:
   initiating an automated software script or process to periodically poll various logical disks in a computer or computer network for removable data drives, thereby creating a list of removable data drives;
   wherein said software script or process periodically polls said various logical disks at least every 10 seconds;
   determining which removable data drives on said list of removable data drives are high risk data drives, thereby creating a list of high risk removable data drives;
   monitoring the file activity on at least one of said high risk removable data drives;
   determining if a file name, mismatch in expected file usage, or a pattern of file activity on said at least one of said high risk removable data drive matches exceeds a preset risk threshold;
   and if said preset risk threshold is exceed, executing a preset suspicious activity function.

2. The method of claim 1, wherein said high risk data drives comprise writeable CD disks, or writeable DVD disks, or writeable blue-ray disks, or any drive with a FAT or FAT32 file system or;
   wherein said removable data drives comprise USB drives, USB memory sticks, CD disks, and DVD disks.

3. The method of claim 1, wherein said file name exceeds a preset risk threshold if said file name is present on a blacklist of high risk file names, or if said file name is absent from a white list of low risk file names.

4. The method of claim 1, wherein said mismatch in expected file usage exceeds a preset risk threshold if said files are accessed from a region of said computer network that is not typically accessed by the computer hosting said at least one high risk removable data drives.

5. The method of claim 1, wherein said pattern of file activity on said at least one of said high risk removable data drive matches exceeds said preset risk threshold if said pattern is a file copy operation followed by a delete operation of the same file within a preset delete time threshold.

6. The method of claim 1, wherein executing a preset suspicious activity function comprises writing said pattern of file activity on a suspicious activity file, or transmitting said pattern of file activity to one or more system administrators.

7. The method of claim 1, wherein no advance installation of unauthorized use detection software on those computers hosting said high risk removable data drives is needed in order to detect said pattern of file activity, or when said pattern of file activity exceeds a preset risk threshold.

8. A method of detecting unauthorized use of removable storage drives to obtain data from a computer or computer network, said method comprising:
   initiating an automated software script or process to periodically poll various logical disks in a computer or computer network for removable data drives, thereby creating a list of removable data drives;
   wherein said removable data drives comprise USB drives, USB memory sticks, CD disks, and DVD disks;
   determining which removable data drives on said list of removable data drives are high risk data drives, thereby creating a list of high risk removable data drives;
   monitoring the file activity on at least one of said high risk removable data drives;
   determining if a file name, mismatch in expected file usage, or a pattern of file activity on said at least one of said high risk removable data drive matches exceeds a preset risk threshold;
   and if said preset risk threshold is exceed, executing a preset suspicious activity function.

9. The method of claim 8, wherein said file name exceeds a preset risk threshold if said file name is present on a blacklist of high risk file names, or if said file name is absent from a white list of low risk file names.

10. The method of claim 8, wherein said mismatch in expected file usage exceeds a preset risk threshold if said files are accessed from a region of said computer network that is not typically accessed by the computer hosting said at least one high risk removable data drives.

11. The method of claim 8, wherein said pattern of file activity on said at least one of said high risk removable data drive matches exceeds said preset risk threshold if said pattern is a file copy operation followed by a delete operation of the same file within a preset delete time threshold.

12. The method of claim 8, wherein executing a preset suspicious activity function comprises writing said pattern of file activity on a suspicious activity file, or transmitting said pattern of file activity to one or more system administrators.

13. The method of claim 8, wherein no advance installation of unauthorized use detection software on those computers hosting said high risk removable data drives is needed in order to detect said pattern of file activity, or when said pattern of file activity exceeds a preset risk threshold.

14. A method of detecting unauthorized use of removable storage drives to obtain data from a computer or computer network, said method comprising:
   initiating an automated software script or process to periodically poll various logical disks in a computer or computer network for removable data drives, thereby creating a list of removable data drives;
   wherein said computer or computer network is a Microsoft windows network, and wherein said automated software script or process runs under a windows management instrumentation (WMI) system;
   determining which removable data drives on said list of removable data drives are high risk data drives, thereby creating a list of high risk removable data drives;
   monitoring the file activity on at least one of said high risk removable data drives;
   determining if a file name, mismatch in expected file usage, or a pattern of file activity on said at least one of said high risk removable data drive matches exceeds a preset risk threshold;
   and if said preset risk threshold is exceed, executing a preset suspicious activity function.

15. The method of claim 14, wherein said automated software script is written in VBscript.

16. The method of claim 14, wherein said file name exceeds a preset risk threshold if said file name is present on a blacklist of high risk file names, or if said file name is absent from a white list of low risk file names.

17. The method of claim 14, wherein said mismatch in expected file usage exceeds a preset risk threshold if said files are accessed from a region of said computer network that is not typically accessed by the computer hosting said at least one high risk removable data drives.

18. The method of claim 14, wherein said pattern of file activity on said at least one of said high risk removable data drive matches exceeds said preset risk threshold if said pattern is a file copy operation followed by a delete operation of the same file within a preset delete time threshold.

19. The method of claim 14, wherein executing a preset suspicious activity function comprises writing said pattern of file activity on a suspicious activity file, or transmitting said pattern of file activity to one or more system administrators.

20. The method of claim 14, wherein no advance installation of unauthorized use detection software on those computers hosting said high risk removable data drives is needed in order to detect said pattern of file activity, or when said pattern of file activity exceeds a preset risk threshold.

* * * * *